(12) United States Patent
Saha et al.

(10) Patent No.: US 8,604,975 B2
(45) Date of Patent: Dec. 10, 2013

(54) CALIBRATION APPARATUS AND METHOD

(75) Inventors: Mrinal Kanti Saha, Hampstead Garden Suburb (GB); Andrew Mark Bishop, Stevenage (GB); Ana Belen Ruiz Jerez, Stevenage (GB); Satwinder Singh Chana, Knebworth (GB)

(73) Assignee: Astrium Limited, Hertfordshire (GB)

( * ) Notice: Subject to any disclaimer, the term of this patent is extended or adjusted under 35 U.S.C. 154(b) by 462 days.

(21) Appl. No.: 12/382,798

(22) Filed: Mar. 24, 2009

(65) Prior Publication Data

US 2010/0164782 A1   Jul. 1, 2010

(30) Foreign Application Priority Data

Dec. 30, 2008  (GB) .................................. 0823593.9

(51) Int. Cl.
*H01Q 3/00* (2006.01)
*G01S 7/40* (2006.01)

(52) U.S. Cl.
USPC ......................................... 342/372; 342/174

(58) Field of Classification Search
USPC ........................... 342/165, 174, 368, 372, 373
See application file for complete search history.

(56) References Cited

U.S. PATENT DOCUMENTS

| | | | |
|---|---|---|---|
| 5,248,982 | A | 9/1993 | Reinhardt et al. |
| 6,163,296 | A | 12/2000 | Lier et al. |
| 6,208,294 | B1 | 3/2001 | Kobayakawa et al. |
| 2003/0064683 | A1 | 4/2003 | Matthews et al. |
| 2004/0108953 | A1 | 6/2004 | Chevalier et al. |
| 2005/0140546 | A1 | 6/2005 | Park et al. |

FOREIGN PATENT DOCUMENTS

| | | |
|---|---|---|
| EP | 0 752 736 | 1/1997 |
| EP | 1 014 485 | 6/2000 |
| JP | 2000-91833 | 3/2000 |
| JP | 2002-141730 | 5/2002 |
| JP | 2006-503487 | 1/2006 |
| JP | 2006-516867 | 7/2006 |
| JP | 2006-319412 | 11/2006 |
| WO | WO 95/34103 | 12/1995 |
| WO | WO 97/00543 | 1/1997 |
| WO | WO 2004/036691 | 4/2004 |
| WO | WO 2008/139219 | 11/2008 |

OTHER PUBLICATIONS

GB Search Report dated May 29, 2009 for GB 0823593.9.
International Search Report and Written Opinion by the International Searching Authority mailed May 12, 2010 in PCT/EP2009/067907.
English translation of Japanese Office Action dated Apr. 23, 2013 in JP 2011-544035.

*Primary Examiner* — Dao Phan
(74) *Attorney, Agent, or Firm* — Nixon & Vanderhye P.C.

(57) ABSTRACT

There is provided an apparatus for calibrating a multi-beam satellite system comprising a beam forming network providing a plurality of signal paths, the apparatus comprising a calibration processor for determining the phase and amplitude shift of a test path relative to a reference path, the calibration processor being configured to determine the phase and amplitude shifts of the test path relative to the reference path for at least two calibration tones of at least two different frequencies to allow a phase and amplitude offset of the test path for a signal of any frequency within an operational frequency range of the multi-beam satellite system to be calculated.

23 Claims, 5 Drawing Sheets

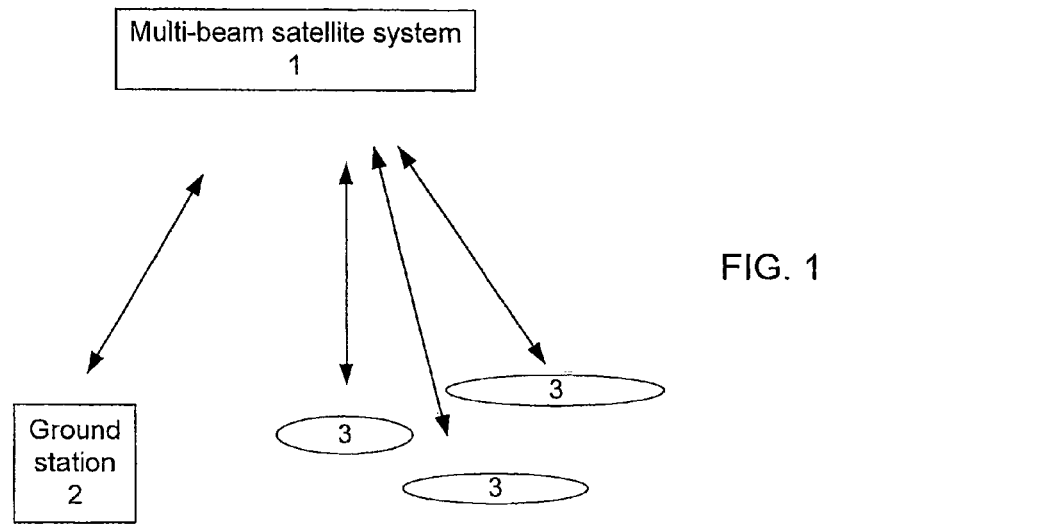
FIG. 1
FIG. 2
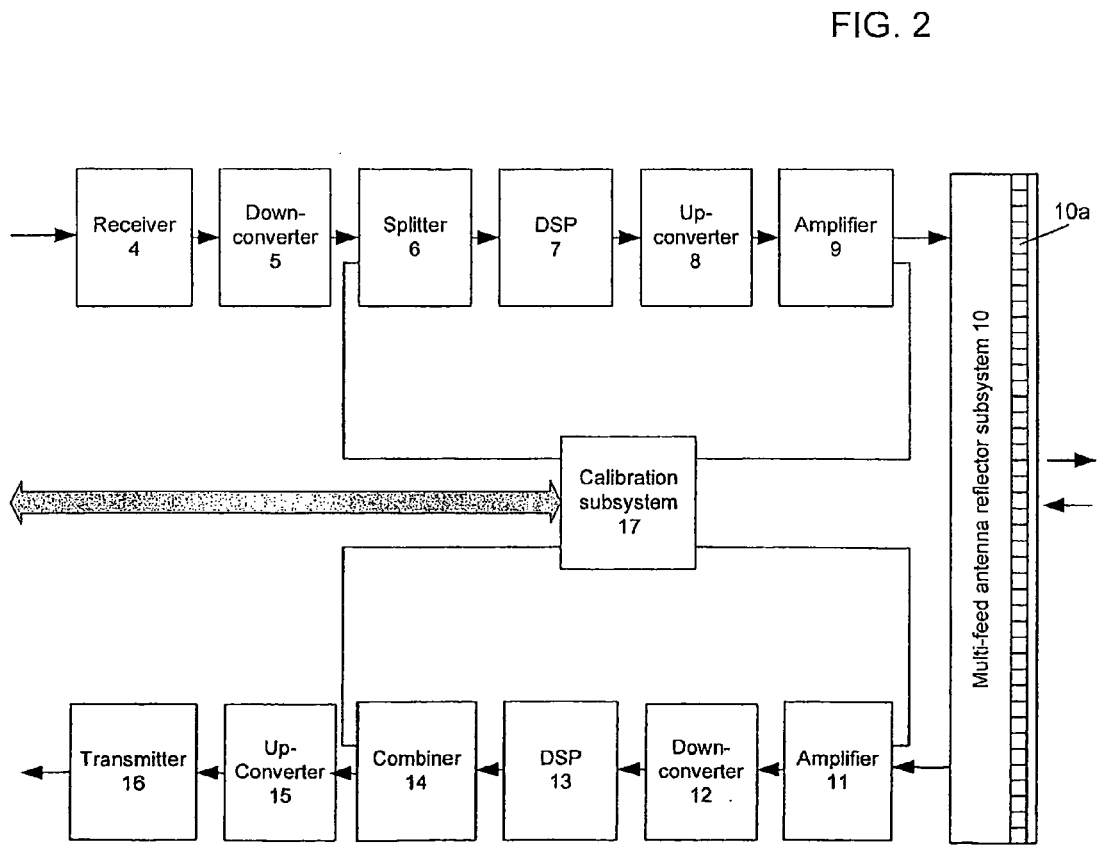

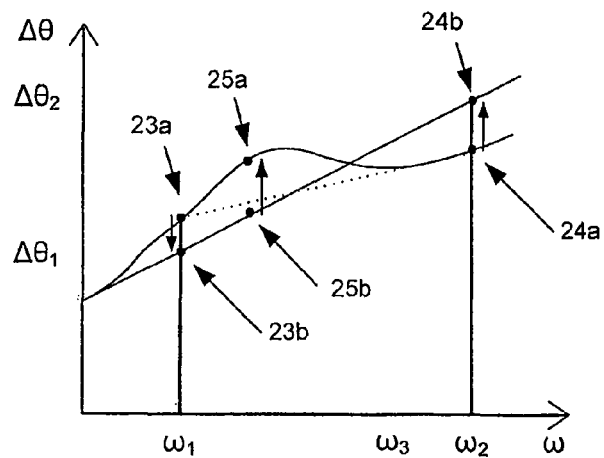
FIG. 5
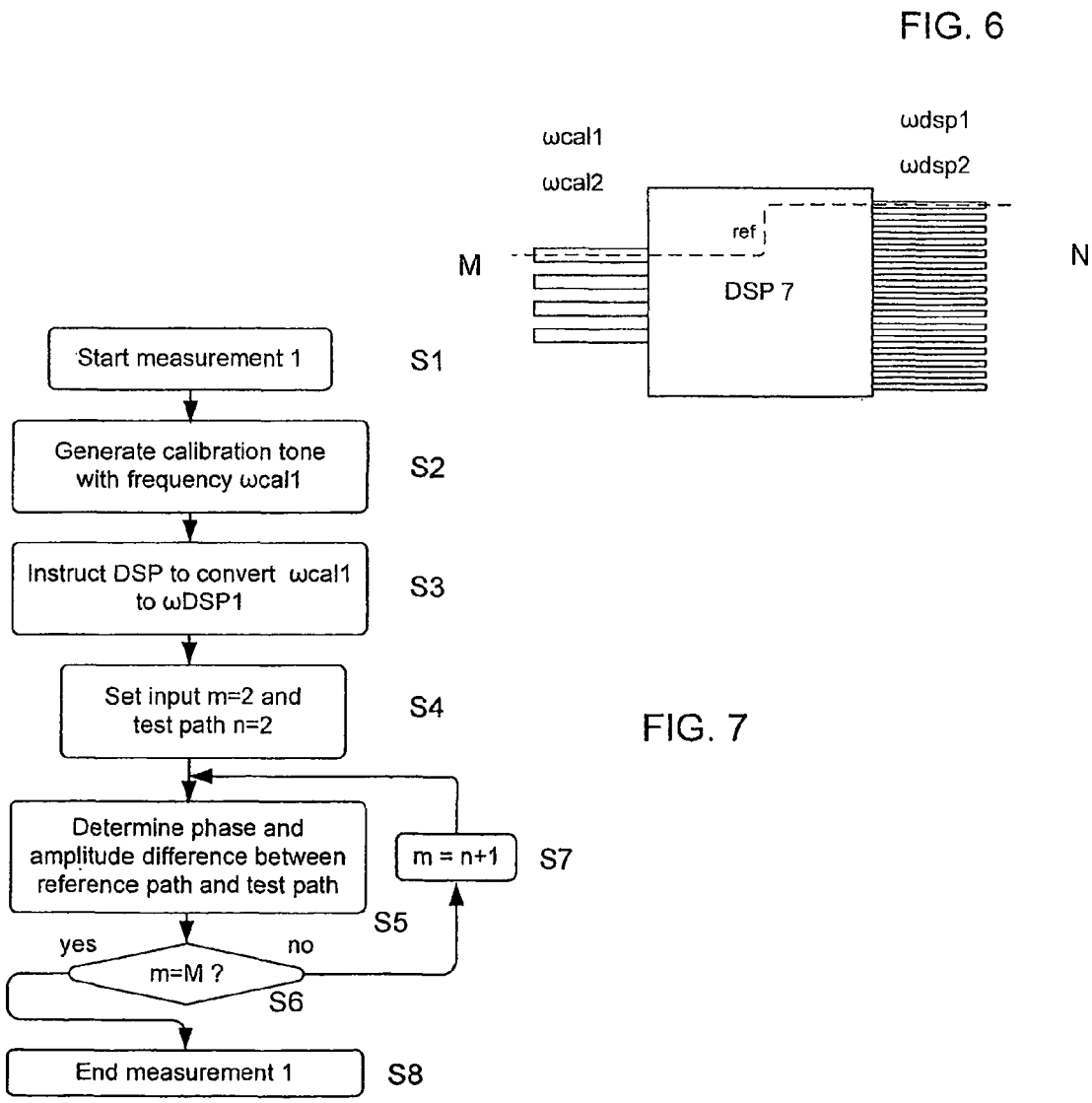
FIG. 6
FIG. 7

CALIBRATION APPARATUS AND METHOD

This application claims priority to GB Application No. 0823593.9 filed 30 Dec. 2008, the entire contents of which are incorporated herein by reference.

FIELD OF THE INVENTION

The invention relates to calibration apparatus and a calibration method for a satellite system comprising a beam forming network.

BACKGROUND OF THE INVENTION

Many commercial satellites are designed to provide multiple narrow beams with required isolation between beams to provide interference free communication services. Some of these multi-beam satellite systems route the input signal along a large number of routes corresponding to a large number of feed elements and set the beamweights (both amplitude and phase) along each route for forming the required beams. Multiple beams are also received by the large number of feed elements and the phase and the amplitude of the signals received by each feed element are adjusted before the signals are combined and forwarded.

Establishing and maintaining the required relative phase and amplitude between the signals for the different feed elements requires calibration of the paths of the signals through the satellite payload to take out any phase and amplitude offsets between the different signals for the different beams prior to applying the beam weights. Equipment used for frequency translation, filtering and amplification, and cables in the transmission path giving time delays are major sources of amplitude and phase differentials in the transmission paths. Even though the system is calibrated before launch, age and temperature differences can cause further amplitude and phase differentials in the transmission paths. The satellite system therefore needs to be calibrated in situ from time to time.

A number of prior art systems have been developed for calibrating the system in situ but many of these systems do not provide satisfactory calibration. For example, the prior art systems do not provide calibration for all frequencies in the system operational bandwidth. To ensure that the required beams are always achieved, it is also important the correct calibration can be applied at any frequency within the operating frequency range of the satellite system.

The invention was made in this context.

SUMMARY OF THE INVENTION

According to the invention, there is provided apparatus for calibrating a multi-beam satellite system comprising a beam forming network providing a plurality of signal paths, the apparatus comprising a calibration processor for determining the phase and amplitude shift of a test path of the plurality of paths by correlating a calibration tone extracted from the test path with a reference calibration signal, the calibration processor being configured to determine the phase and amplitude shift of the test path for at least two calibration tones of at least two different frequencies to allow a phase and amplitude offset of the test path for a signal of any frequency within an operational frequency range of the multi-beam satellite system to be calculated.

The apparatus may further comprise means for injecting a calibration tone into the test path and the at least two calibration tones may comprise two calibration tones of different frequencies at the times of injection. The apparatus may further comprise a digital signal processor for translating the frequency of a calibration tone in the test path and the at least two calibration tones may comprise two calibration tones translated into two different frequencies.

The apparatus may also comprise means for selecting a test path from the plurality of signal paths, the test path selection means being configured to, for a calibration tone of a specific injection frequency and frequency translation, sequentially select each of the paths from a group of paths of the plurality of paths as the test path to allow the phase and amplitude offsets of each path from the group of paths to be determined. The apparatus may comprise a beam forming network having a plurality of inputs and a plurality of outputs and the group of paths may be selected from all paths through a specific input or all paths through a specific output. The beam forming network may be configured to apply corrections to said test path based on the determined phase and amplitude shifts of the test path for the at least two calibration tones of the at least two different frequencies.

Consequently, the invention allows the phase and amplitude shift of any path for any initial frequency and any frequency translation to be determined. The satellite payload can then take out any phase and amplitude offsets between the different signals for the different beams prior to applying the beam weights.

The reference calibration signal may comprise a calibration tone extracted from a reference path of said plurality of paths. Alternatively, the reference calibration signal may comprise a pure calibration tone at a frequency of the calibration tone extracted from the test path.

Yet further, the apparatus may comprise a transmitter for transmitting the determined phase and amplitude shifts to a ground station and a receiver for receiving corrections to be applied to the beam forming network from the ground station based on the determined phase and amplitude shifts.

For a forward link of a satellite communication system, the apparatus may comprise a beam splitter for forwarding a signal to the beam forming network; an amplifier for amplifying signals from the beam forming network, the test path comprising a path from the beam splitter to the amplifier; a coupler for injecting a calibration tone into the beam splitter; and a switch unit for forwarding said signal from said test path from the amplifier to the calibration processor.

For a return link of a satellite communication system, the apparatus may comprise an amplifier for amplifying a signal for a beam forming network; a signal combiner for combining a signal received from a beam forming network, said test path comprising a path from the amplifier to the combiner; a switch unit for injecting a calibration tone into the test path in the amplifier; and means for forwarding said signal from said test path from said signal combiner to the calibration processor.

According to the invention, there is also provided a multi-beam satellite system comprising the above described apparatus.

According to the invention, there is also provided a satellite communication system comprising the multi-beam satellite system and a ground station configured to receive phase and amplitude shift measurements from the multi-beam satellite system, calculate corrections for a signal of a predetermined frequency and transmit the corrections to the multi-beam satellite system.

The system may comprise means for adjusting the determined phase and amplitude shifts and corrections based on the determined phase and amplitude shifts for amplitude and phase offsets introduced by equipment in the plurality of paths having non-linear phase and amplitude characteristics.

According to the invention, there is also provided a method of calibrating a multi-beam satellite system having a beam forming network providing a plurality of signal paths, the method comprising extracting calibration tones from a test path of the plurality of paths; and determining the phase and amplitude shifts of the test path for the calibration tones by correlating the extracted calibration tones with reference calibration signals, wherein the calibration tones comprise at least two calibration tones of different frequencies to allow phase and amplitude offsets of the test path for a signal of any frequency within an operational frequency range of the multi-beam satellite system to be calculated from the determined phase and amplitude shifts.

Extracting calibration tones may comprise extracting a first calibration tone of the at least two calibration tones of different frequencies and subsequently extracting a second calibration tone of the at least two calibration tones of different frequencies.

The method may further comprise injecting calibration tones into the test path and the at least two calibration tones of different frequencies may comprise two calibration tones of different frequencies at the times of injection. The method may further comprise translating the frequency of the calibration tones in the test path and the at least two calibration tones of different frequencies may comprise calibration tones translated into two different frequencies.

The method may further comprise, for a calibration tone of a specific injection frequency and frequency translation, sequentially selecting each of the paths from a group of paths of the plurality of paths as the test path to allow the phase and amplitude shift of each path from the group of paths to be determined. The group of paths may be selected from all paths through a specific input to a beam forming network or all paths through a specific output from a beam forming network.

The method may further comprise extracting a calibration tone from a reference path of the plurality of paths and providing the extracted calibration tone as one of said reference calibration signals for said extracted calibration tones from the test path. Alternatively, the calibration reference signals may comprise a pure calibration tone at a frequency of one of the calibration tones extracted from the test path.

The method may further comprise applying a correction to the beam forming network based on the determined phase and amplitude shifts for the at least two calibration tones of different frequencies.

Additionally, the method may further comprise transmitting the determined phase and amplitude shifts to a ground station and receiving said corrections from the ground station. Furthermore, the method may comprise adjusting the determined phase and amplitude shifts and corrections determined based on the determined phase and amplitude shifts for amplitude and phase shifts introduced by non-linear equipment in the plurality of paths.

According to the invention, there is also provided a computer program comprising instructions that when executed by a processor cause the processor to perform the above described method.

BRIEF DESCRIPTION OF THE DRAWINGS

Embodiments of the invention will now be described, by way of example, with reference to FIGS. 1 to 11 of the accompanying drawings, in which:

FIG. 1 shows a communication system in which the invention can be implemented;

FIG. 2 is a schematic diagram of some of the components of the forward and the return link in the a multi-beam satellite system of the satellite communication system;

FIG. 5 illustrates how a correction is determined for any operational frequency of a the multi-beam satellite system in a multi-beam satellite system with non-linear components;

FIG. 6 illustrates the different paths and the different frequencies on which measurements are performed;

FIGS. 7, 8 and 9 illustrate a process of collecting data for performing the calibration of the multi-beam satellite system;

DETAILED DESCRIPTION

Figure 3:
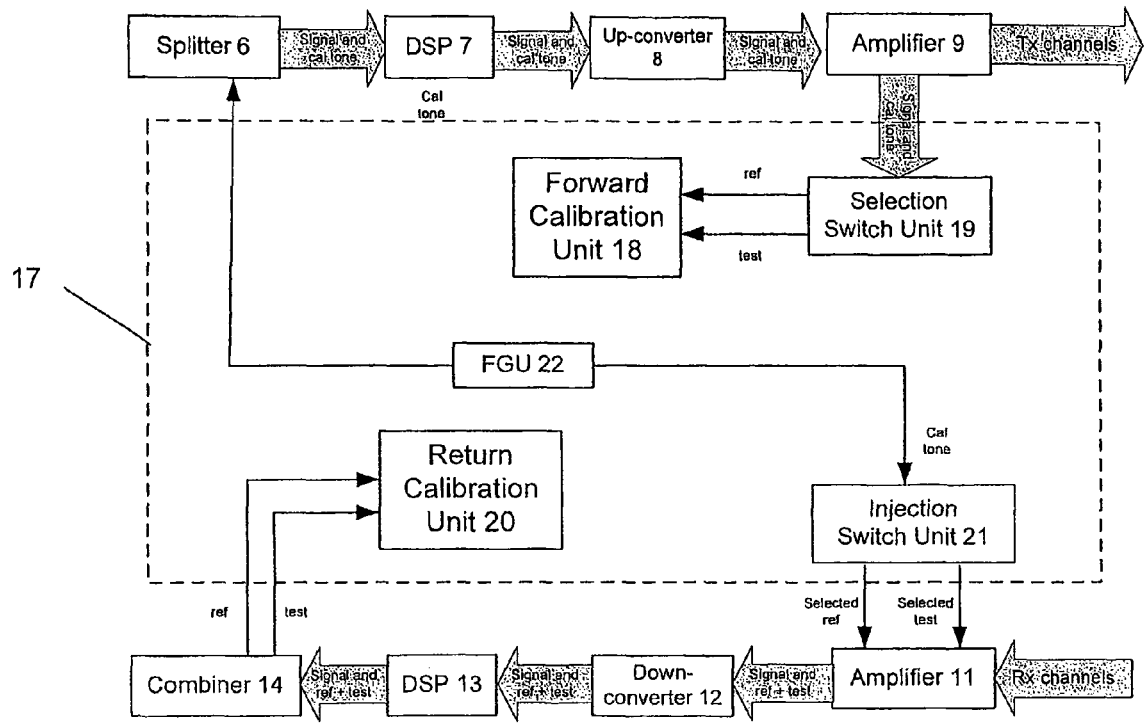
FIG. 3 schematically shows the paths of the signal and the calibration tones through the components of the multi-beam satellite system according to one embodiment.

With respect to FIG. 1, a communication system comprises a multi-beam satellite system 1, a system operator ground station 2, and a plurality of satellite communication subscriber locations 3. The multi-beam satellite system 1 receives a signal from the ground station 2, processes the signal and transmits information in the signal to the plurality of subscriber locations 3. The multi-beam satellite system 1 may also receive signals from the subscriber locations 3, process the information and forward the information in the signals to the ground station 2. The ground station 2 may also be used to control the satellite or forward instructions and data between the satellite and a control station for controlling the satellite. Also, instead of receiving and transmitting information to the ground station 2, the multi-beam satellite system may forward the information to another satellite or directly between subscriber locations.

With reference to FIG. 2, the multi-beam satellite system 1 comprises a forward link and a return link. In the forward direction, signal inputs, comprising a plurality of frequency channels, are received in a receiver 4 from the ground station 2 and down-converted for processing to base-band by a down-converter 5. The receive signals inputs are then split through one or more signal splitters 6 and forwarded to a digital signal processor (DSP) 7 that provides a beam forming network. The digital signal processor 7 processes and routes the receive input signals to form required beams for the subscriber locations 3. The required beams are created by routing the signal along a plurality of routes and setting the phase and amplitude of the signal for each route to form the required beams. The output signals from the digital signal processor 7 are then up-converted by up-converter 8 to the operating RF band, amplified by amplifiers 9 and transmitted in the selected user downlink beams by a multi-feed antenna reflector subsystem 10. The amplifier 9 may comprise a plurality of multi-port amplifiers, each serving a portion of the routes. The multi-feed antenna reflector subsystem 10 comprises a plurality of feed elements 10a, one for each route along which the signals are routed in the digital signal processor 7.

In some embodiments, the digital signal processor may comprise a plurality of digital signal processor modules. Each module handles a portion of the signals from the splitter 6. Each digital signal processor module 7 may provide analogue to digital conversion, routing of channel to beam, frequency mapping (including frequency translation) to support operational frequency planning and frequency reuse, channel beam forming and the digital to analogue conversion for a portion of the input signal.

Similarly, in the return direction, the signal inputs are received by a plurality of separate feed elements 10a of the multi-feed antenna reflector subsystem 10 and routed along different routes to an amplifier 11. The signals are then amplified by the amplifier 11 and down-converted by a down-converter 12 to base-band for processing. The down-converted signals are then processed and combined by a digital signal processor (DSP) 13 and a combiner 14, up-converted to a frequency suitable for transmission to the ground station 2 by an up-converter 15 and transmitted by a transmitter 16. The amplifier 11 may comprise a low-noise amplifier for each path.

In some embodiments, the digital signal processor 13 comprises a plurality of modules, each module being arranged to process the signals from a portion of the feed elements. Each digital signal processor module provides analogue to digital conversion of the baseband signal, beam forming and digital to analogue conversion. The digital signal processor modules 13 may also provide anti-aliasing filters, mixers for mixing of signals with local oscillator frequencies, gain control capabilities and band-pass filters.

Although not shown, the multi-feed antenna reflector subsystem 10 of FIG. 2 may comprise a diplexer for each feed element and a reflector. Also, although the receiver 4 and the transmitter 16 for receiving and transmitting signals to the same ground station are shown as separate components, they may form part of the same component.

Since the beam forming relies on the way that the phase and amplitude of the signal for a particular feed element is set relative to the phase and amplitude of a signal for another feed element, it is important to know the phase and amplitude offsets of each path a signal can take through the satellite payload. The forward digital signal processor typically has a small number of inputs and a large number of outputs defining routes to the large number of feed elements. Consequently, the forward transmission link comprises a plurality of possible transmission paths, each path being defined by a particular input to the digital signal processor and a particular route from the digital signal processor to a feed element. Similarly, in the return link, the digital signal processor has a large number of inputs corresponding to the large number of feed elements and a small number of outputs to the combiner. The return link therefore has a plurality of possible paths, each path being defined by a route from a particular feed element and an output to the combiner.

The cables in the transmission paths and the equipment used for frequency translation, filtering and amplification give rise to time delays and amplitude and phase differentials in the paths. Since different paths may comprise different equipment and cables, the phase and amplitude shift of a signal in one path may be different to the phase and amplitude shift in another path. For example, the phase and amplitude of a signal in the forward link passing through a first splitter to a first input to a first digital processor module 7 and thereafter through a first output to a first multi-port amplifier 9 may be different to the phase and amplitude of a signal passing through a second splitter to a second input to a second return digital signal processor module and thereafter through a second output to a second multi-port amplifier.

The system is calibrated before launch at ambient temperature to determine the phase and amplitude shift along each path. However, the phase shift along each path may change, once the satellite has been launched, due to temperature changes, environmental effects, changes in redundancy configuration of transmission paths and age. The system therefore needs to be re-calibrated from time to time. Any drift due to temperature or life can then be seen when comparing the result of the payload calibration in-orbit with the initial calibration on ground.

The system comprises a calibration subsystem 17 for determining the phase and amplitude shift in the paths. Below, the calibration subsystem will be described to determine the phase and amplitude offset in the paths from the splitter 6 to the amplifier 9 in the forward path and in the amplifier 11 to the combiner 14 in the return path. However it should be realised that this is just one example and the calibration paths may include fewer or more components.

In the forward path, the calibration subsystem 17 inserts a calibration tone in the splitters 6 and extracts the calibration tone from a selected output from the amplifiers 9 and determines the phase and amplitude offset of the signal. As will be described in more detail below, the phase and amplitude offset may either be determined relative to another path or to the pure calibration signal. The phase and amplitude measurement in the path may also be repeated for a number of different frequencies to allow the results to be extrapolated to any operational frequency of the multi-beam satellite system. The results are sent to the ground station 2, which calculates the corrections that need to be applied to the transmission path at a given frequency. Instructions to implement the corrections are returned to the multi-beam satellite system 1. For example, the instructions may be returned directly to the digital signal processor 7 or via the calibration subsystem 17. The corrections are applied by adjusting the phase and amplitude weights in the beamforming network in the digital signal processor 7.

In the return path, the calibration subsystem 17 injects a calibration tone in an input to the amplifier 11. The calibration subsystem then extracts the calibration tone from the combiner 14 and determines the phase and amplitude shift in the path. Again, the phase and amplitude shift may either be determined relative to another path or to a pure calibration signal. The phase and amplitude measurement in the path may also be repeated for a number of different frequencies to allow the results to be extrapolated to any operational frequency. Again, the results of the measurements are sent to the ground station 2 which calculates the corrections that need to be applied to a signal of a specific frequency in the transmission path. Instructions to implement the corrections for the transmission paths are returned to the multi-beam satellite system. For example, instructions may be returned directly to the digital signal processor 13 or via the calibration subsystem 17. The corrections are applied by adjusting the phase and amplitude weights in the beamforming network in the return digital signal processor 13.

With reference to FIG. 3, the signal flow in the system according to a first embodiment of the invention will now be described. The calibration subsystem 17 comprises a forward calibration unit 18 for relative phase and amplitude measurements of forward reference and test paths, a selection switch unit 19 for selection of paths for measurements, a return calibration unit 20 for relative phase and amplitude measurements of a signal in the return reference and test paths, an injection switch unit 21 for injection of return calibration tones to selected paths for the amplifiers 11 and a common frequency generator unit (FGU) 22. The forward and return calibration units 18, 20 may comprise processors for correlating the signals in the reference and test paths to find the relative phase and amplitude offsets. Any type of suitable couplers and switches may be used to implement the selection switch unit 19 and the injection switch unit 21. Couplers may also be used for injecting the calibration tone into the splitters 6 and extracting the signals comprising the calibration tones from the reference and test paths. The couplers for extracting the signals from the paths may be comprised in the selection switch unit 19 and the return generation unit 20.

In the forward path, on instruction by the forward calibration unit 18, the frequency generator unit 22 generates a calibration tone at a suitable frequency. Typically, a frequency channel not used by the traffic in the forward path is selected for the calibration tone. The calibration tone is provided to the splitters 6 which inserts the calibration tone into selected outputs of the splitters 6 leading to one of the inputs of the digital signal processor 7. Typically, the digital signal processor 7 has at least two inputs and routes the signal and the calibration tones via the multiport-amplifiers 9 towards 120 different feed elements 10*a* in the multi-feed antenna reflector subsystem 10. The selection switch unit 19 selects the signal in a reference path and a test path from the output of the amplifiers 9 and forwards the selected signals to the forward calibration unit 18 to allow the forward calibration unit 18 to determine the amplitude and phase difference between the calibration tones of the two paths. The reference path may be the path comprising the first input to the digital signal processor and the route from the digital signal processor to the first feed element in the multi-beam antenna subsystem. The test path may initially be selected as the path through the first input to the digital signal processor 7 and the output leading to the second feed element in the multi-beam antenna subsystem 10.

In the return path, on instruction by the return calibration unit 20, the frequency generator unit 22 generates and forwards a calibration tone of a suitable frequency to the injection switch unit 21. The frequency of the calibration tone is selected as not to interfere with the traffic in the return direction. The calibration tone is then inserted by the injection switch unit 21 into two inputs of the amplifier 11 and combined with the received signals from two of the 120 different feed elements.

The signal from the 120 feed elements and the calibration tones are amplified by the amplifier 11, processed and combined by the return digital signal processor 13 and combined by the combiner 14. The calibration tones and the traffic signals received in the combiner from two of the outputs of the digital signal processor are then extracted and the return calibration unit 20 determines the phase and amplitude difference between the calibration tones of the two paths. The reference path may be the path starting at the first feed element of the multi-beam antenna subsystem 10 and passing through the first output of the digital signal processor. The test path may initially be selected as the path starting at the second feed element and passing through the second output of the digital signal processor.

To ensure that all paths in the system are calibrated, the selection switch unit 19 in the forward link and the injection switch unit 21 are configured to then select/inject the calibration tone from/into a new test path. Measurements may be repeated until enough data have been collected to allow the relative phase and amplitude differences between all paths compared to the reference path to be calculated at the tested calibration tone frequency. According to some embodiments, in the forward link, for a given input to the digital signal processor, phase and amplitude measurements may be carried out for each route from the digital signal processor to a feed element. Also, for a given output to a feed element, phase and amplitude measurements may be carried out for each input to the digital signal processor. Similarly, in the return link, for a given output from the digital signal processor, phase and amplitude measurements may be carried out for each route from the feed element to the digital signal processor and for a given route from the feed element to the digital signal processor, phase and amplitude measurements may be carried out for each digital signal output. The different measurements will be described in detail with respect to FIGS. 6, 7, 8 and 9.

As mentioned above, the measurements are also repeated for two different frequencies to allow the relative phase and amplitude difference between all paths compared to the reference path to be calculated at any operational frequency. The measurements at different frequencies will be described in more detail with respect to FIGS. 4 and 5.

Figure 4:
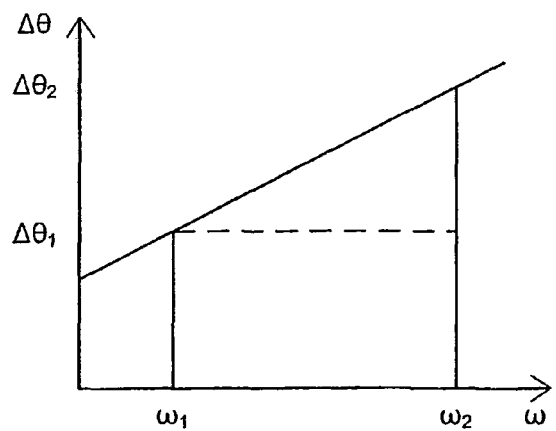
FIG. 4 illustrates how a correction is determined for any operational frequency of the multi-beam satellite system.

With reference to FIG. 4, the phase difference between two paths for a calibration tone of frequency $\omega_1$ is $\Delta\theta_1$. In the prior art, it was assumed that the phase difference between the two paths for the calibration tone at frequency $\omega_2$ was also $\Delta\theta_1$. This may be a satisfactory approximation in systems in which the frequency variations are very small. However, in systems which must be able to handle traffic of different frequencies, this approximation is not adequate. If a correction is applied based on a calibration measurement at one frequency, the applied correction factor would not be able to neutralise the phase errors within the required limits at other frequencies within the system operational bandwidth. The invention solves this problem by determining the phase difference at another frequency $\omega_2$. With respect to FIG. 4, the phase difference at this frequency is determined to be $\Delta\theta_2$. Using $\omega_1$, $\omega_2$, $\Delta\theta_1$ and $\Delta\theta_2$, the phase difference at any frequency can be determined by extrapolation at the ground station 2.

It should be realised that FIG. 4 is just a schematic diagram and the phase differentials is not necessarily linearly dependent on the frequency as they are formed from both frequency dependent and frequency independent relative time delays. The phase of the transmission path can be considered to have three components, 1) a linear component proportional to frequency due to frequency independent time delays, 2) a constant phase offset due to up or down converter local oscillator signal delays or phase changes and 3) a non-linear component that is a product of operating frequency and frequency dependent time delays of equipments such as filters, amplifiers and any other non-linear device. When components with considerable non-linear phase and amplitude characteristics are included in the transmission paths, the values may be corrected for, as shown in FIG. 5, by looking up equipment data for the non-linear components.

With respect to FIG. 5, the non-linearity of a filter in the transmission path causes the overall phase variation in the transmission path to be highly non-linear with respect to frequency. According to the invention, two measurements 23*a*, 24*a* are made for a single path at two separate frequencies $\omega_1$, $\omega_2$. The measurements show that the phase shift in the path is $\Delta\theta_1'$ at frequency $\omega_1$ and $\Delta\theta_2'$ at frequency $\omega_2$. It is known that these measurements are affected by the non-linearity of the filter. From manufacturer equipment data, experiments or simulations, the phase shift introduced by the filter is known for each frequency. Consequently, at the ground station 2, the phase shift of the filter at frequencies $\omega_1$, $\omega_2$ is looked up and measurements 23*a* and 24*a* are corrected to give corrected phase shifts 23*b* and 24*b* as shown in FIG. 5. From these values, it is desired to obtain a predicted phase shift 25*a* at frequency $\omega_3$ for the path, which takes into account the phase shift added by the filter. To obtain the predicted phase shift, the values are extrapolated, assuming a linear relationship between phase and frequency to give an uncorrected phase shift 25*b* at frequency $\omega_3$. The phase shift of the filter is then looked up and added to the uncorrected phase shift 25b to give a corrected phase shift 25a. The ground station 2 then returns the corrected phase shift value 25a to the satellite payload to be applied to the path in the beam forming network. As shown in FIG. 5, if the two initial phase shift measurements were extrapolated without corrections (see hashed line), the predicted value for frequency $\omega_3$ would be incorrect.

Although corrections have been described for a filter, it should be realised that corrections may be applied for any non-linear device or group of non-linear devices. The corrections may be obtained by looking up equipment data for the non-linear devices. The equipment data may be provided by the manufacturer or obtained through experiments or simulations before or after launch. The equipment data may be stored in a look-up table in a memory in the ground station. Since the behaviour of the non-linear device may vary with temperature, the satellite payload may also comprise a temperature sensor and the corrections may be applied with consideration to the temperature sensed by the temperature sensor.

Although it has been described that the corrections are performed at the ground station, it is also possible that the corrections are applied to the measured value before being sent to the ground station and, similarly, that the correction is calculated in the satellite payload for a predicted value sent from the ground station 2. The equipment data may therefore be stored in a memory in the satellite payload in addition to or as an alternative to being stored in the ground station.

Additionally, FIGS. 4 and 5 only show the phase shift. It should be realised that corresponding calculations may be carried out for the amplitude shift in the transmission paths.

According to some embodiments of the invention, measurements are also performed to take into account frequency translations of the signals carried out by the digital signal processors 7, 13. Frequency translations in the digital signal processor also affect the phase shift because when the frequency of the signal changes so does the phase and amplitude shifts. By taking the frequency translation into account in the calculations of the required phase and amplitude shifts a correct phase and amplitude shift can be determined for any initial frequency and any frequency translation. By determining the phase and amplitude shifts of a test path for two different initial calibration tone frequencies and for two different frequency translations, it can also be determined what portion of the phase and amplitude shifts occurred before the frequency translation and what portion of the phase and amplitude shifts occurred after the frequency translation.

The process of performing the measurements at different frequencies will now be described with respect to FIGS. 6 to 9. The process will only be described with respect to the forward link. However, it should be apparent that a corresponding method could be used for the return link. With reference to FIG. 6, a digital signal processor comprises M inputs and N outputs leading to N feed elements. A first sequence of measurements for different paths is performed for a first calibration tone frequency $\omega_{cal1}$ and a first frequency translation to $\omega_{DSP1}$. A second sequence of measurements for different paths is then performed for a second calibration tone frequency $\omega_{cal2}$ and the first frequency translation to $\omega_{DSP1}$. Finally, a third sequence of measurements for different paths is performed for the second calibration tone frequency $\omega_{cal2}$ and a second frequency translation to $\omega_{DSP2}$. The measurements allows the phase and amplitude shifts of each path leading up to the digital signal processor 7 to be calculated for any initial frequency and the phase and amplitude shifts of each path leading away from the digital signal processor 7 towards a feed element 10a to be calculated for any frequency translation. Throughout the measurements, it will be assumed that the reference path is defined by the first input to the digital signal processor, m=1, and the first feed element, n=1, as shown in FIG. 6.

The first sequence of measurements will now be described with respect to FIG. 7. The measurement starts at step S1. The measurements may be initiated by the ground station 2. The frequency generator unit 22 is instructed to generate a calibration tone of frequency $\omega_{cal1}$ at step S2 and the DSP 7 in the forward path is set to convert the signal to a frequency $\omega_{DSP1}$ at step S3. The calibration unit 18 then selects a test path at S4 and instructs the splitters 6 and the selection switch unit 19 accordingly. Typically, the test path is initially selected as the path comprising the second input to the digital signal processor, m=2, and the output to the second feed element, n=2. The signals in the test and reference paths are then extracted and forwarded to the calibration unit 18 from the selection switch unit 19. The calibration unit 18 subsequently determines the phase and amplitude difference between the calibration tones in the two signals at step S5. If the phase differences of all inputs have not been checked at step S6, i.e. if the number of the input m is smaller than the number of the last input M, the calibration unit 18 selects a new input at step S7, by for example incrementing m by 1, and instructs the splitter 6 to inject the calibration tone in the new input. Step S4 is then repeated for the new test path.

Figure 8:
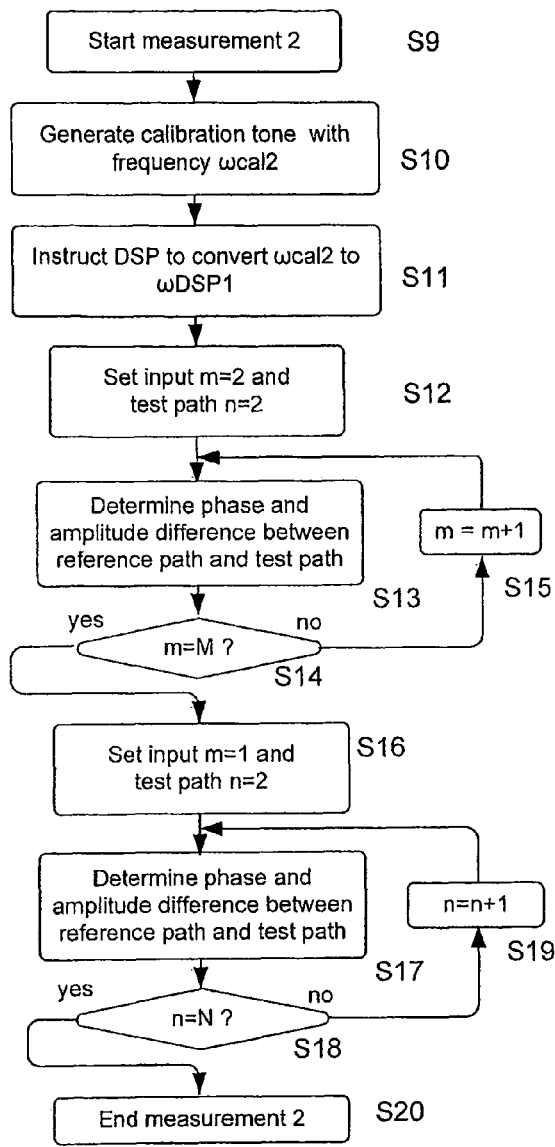

The second sequence of measurements will now be described with respect to FIG. 8. The measurements start at step S9. The frequency generator unit 22 is instructed to generate a new calibration tone of frequency $\omega_{cal2}$ at step S10, and the DSP 7 is set to translate the signal to frequency $\omega_{DSP1}$ at step S11. The calibration unit 18 then selects a test path at S12. The test path may be selected as the path comprising the second input to the digital signal processor, m=2, and the second output from the digital signal processor leading to the second feed element, n=2. The splitter is instructed to insert the calibration tone into the signal for the second input to the digital signal processor and the selection switch unit 19 is instructed to forward the signal on route to the second feed element to the forward calibration unit 18. The calibration unit 18 then determines the phase and amplitude difference between the calibration tones of the two signals at step S13. If the phase differences of all inputs have not been checked at step S14, i.e. if the number of the input m is smaller than the number of the last input M, the calibration unit 18 selects a new input at step S15, by for example incrementing m by 1, and instructs the splitter to inject the calibration tone in the new input. Step S13 is then repeated for the new test path. When the phase and amplitude shift of all possible paths to the selected feed element have been compared to the phase and amplitude shift of the reference path, the process proceeds to step S16 for measuring the phase and amplitude shift of all paths from a single input to all the feed elements. At step S16, a test path is selected to comprise the first input to the digital signal processor 7 and the route to the second feed element. The process then loops through the paths from the first input to all feed elements and determines the phase and amplitude difference between the paths at steps S17, S18 and S19. When the phase and amplitude of the paths from the first input to all feed elements have been compared to the reference path, i.e. the number of the route to a feed element, n, is equal to the total number of routes, N, the second sequence of measurements ends at step S20.

Figure 9:
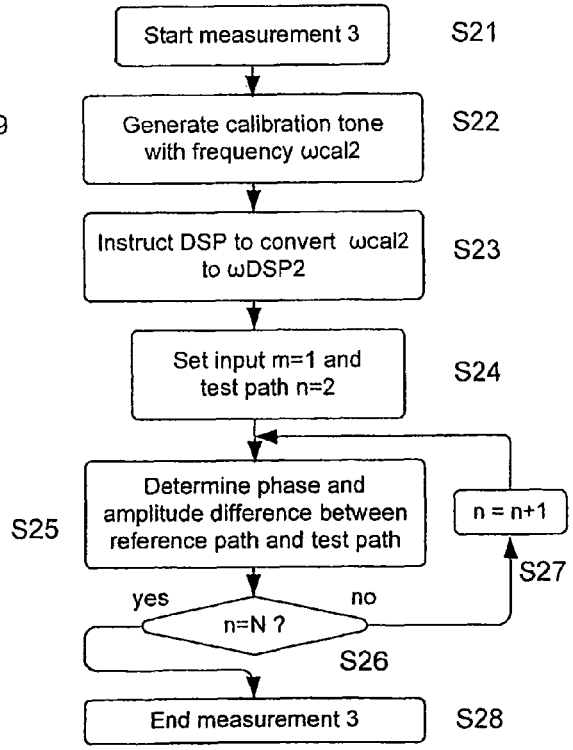

The third sequence of measurements will now be described with respect to FIG. 9. The measurements start at step S21. The frequency generator unit 22 is instructed to generate a new calibration tone of frequency $\omega_{cal2}$ at step S22, and the DSP 7 is set to translate the signal to frequency $\omega_{DSP2}$ at step S23. The calibration unit 18 then selects a test path at S24. The test path may be selected as the path comprising the first input to the digital signal processor, m=1, and the second output from the digital signal processor leading to the second feed element, n=2. The signals in the test and reference paths are then extracted and forwarded to the calibration unit 18, which determines the phase and amplitude difference between the calibration tones from the two paths at step S25. If the phase and amplitude differences of all paths between the first input and the feed elements have not been checked at step S26, i.e. if the number of the route to a feed element, n is smaller than the total number of feed elements, N, the calibration unit 18 selects a new route at step S27, by, for example, incrementing n by 1, and instructs the selection switch unit 19 to forward the signal in a different path. Step S25 is then repeated for the new test path. When the phase and amplitude shift of all possible paths from the first input to the feed elements have been compared to the phase and amplitude shift of the reference path, the process proceeds to step S28 and the third sequence of measurements ends.

Consequently, the relative phase and amplitude shifts in the paths leading up to the digital signal processor are measured for two different frequencies and the relative phase and amplitude shifts in the paths leading from the digital signal processor towards the feed elements are also measured for two different frequencies. Consequently, the phase and amplitude shift in any path with any initial frequency and for any frequency translation can be calculated. It should be realised that although the reference path and the initial test paths have been described to be specific paths with respect to FIGS. 6 to 9, any two paths can be selected as the reference path and the initial test path.

The ground station 2 receives the measured phase and amplitude shifts and calculates the phase and amplitude corrections that need to be applied in each path to calibrate the system based on the measurements received from the calibration units. The calculations will not be described in detail herein since it would be known to the skilled person how to calculate the required phase and amplitude corrections once the measurements described above have been obtained. The measurements may be sent to the ground station after each individual measurement of after all the measurements described with reference to FIGS. 7 to 9 have been completed.

It should be realised that the components of the calibration subsystem 17 may be implemented as hardware or software or a combination of hardware and software.

In some circumstances, instead of applying the calibration tone to each path sequentially, the tone can be applied to all paths simultaneously. Similarly, two tones of different frequencies may be applied simultaneously.

It should be realised that although it has been described above that the calculations to find the phase and amplitude corrections are performed at the ground station, the calculations may also be performed on board the satellite.

Figure 10:
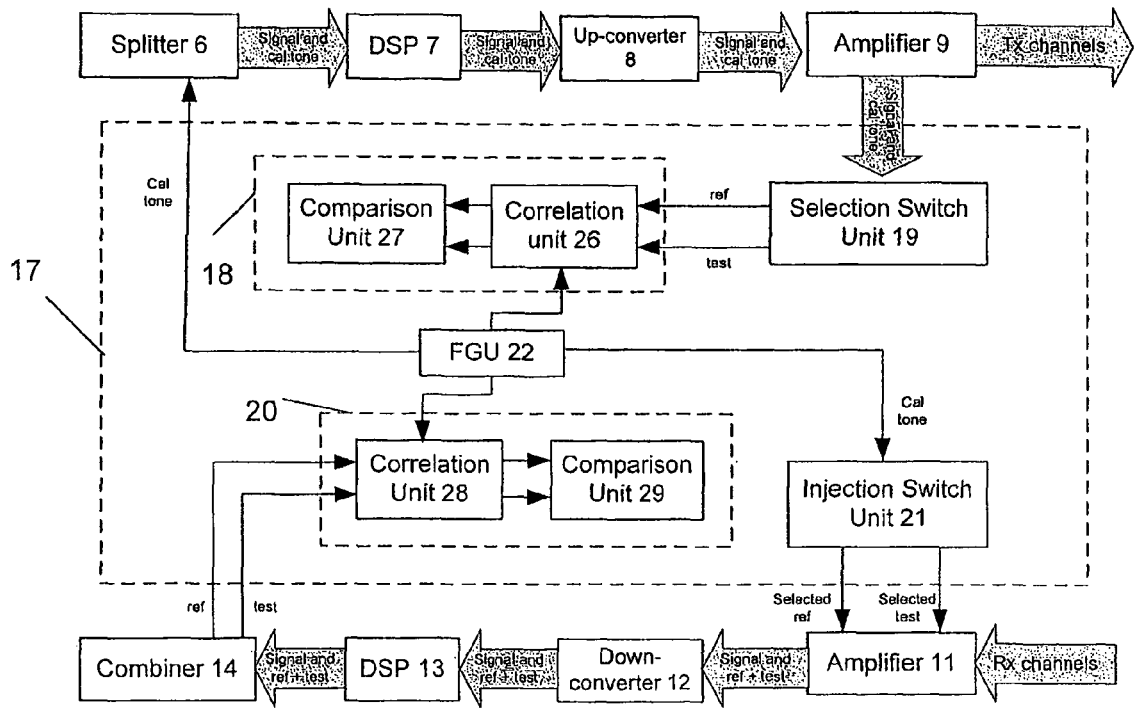
FIG. 10 schematically shows the paths of the signal and the calibration tones through the components of the multi-beam satellite system according to another embodiment.

With reference to FIG. 10, another embodiment is shown, with provides advantages when there are no spare frequency channels to select for the calibration tone or when there is noise on the calibration tone frequency. In this case embodiment, the forward calibration unit 18 comprises a correlation unit 26 connected to the frequency generator unit 22 and a comparison unit 27. Furthermore, the return calibration unit 20 comprises a correlation unit 28 connected to the frequency generator unit 22 and a comparison unit 29. The other shown components are the same as in FIG. 3 and a detailed description of the components is therefore omitted. The forward correlation unit 26 receives the pure calibration tone translated to have the frequency to which the signal in the test and reference path is translated in the forward DSP 7. The correlation unit 26 then correlates the test and the reference signal in the forward link with the pure calibration tone to find the phase and amplitude shift of the test and the reference signals. The phase and the amplitude shift of the test and the reference signals are then compared in the comparison unit 27 to find the relative phase and amplitude shifts as before. Similarly, the return correlation unit 28 receives the pure calibration tone translated to have the frequency to which the signal in the test and the reference path has been translated by the return DSP 13. The correlation unit 28 then correlates the test and the reference signal with the pure calibration tone to find the phase and amplitude shift of the test and the reference signals. The phase and the amplitude shift of the test and the reference paths in the return link are then compared in the comparison unit 29 to find the relative phase and amplitude shifts as before. By correlating the reference and test signals against the pure calibration tone, the effects of noise and other traffic on the calibration tone frequency can be minimised.

Figure 11:
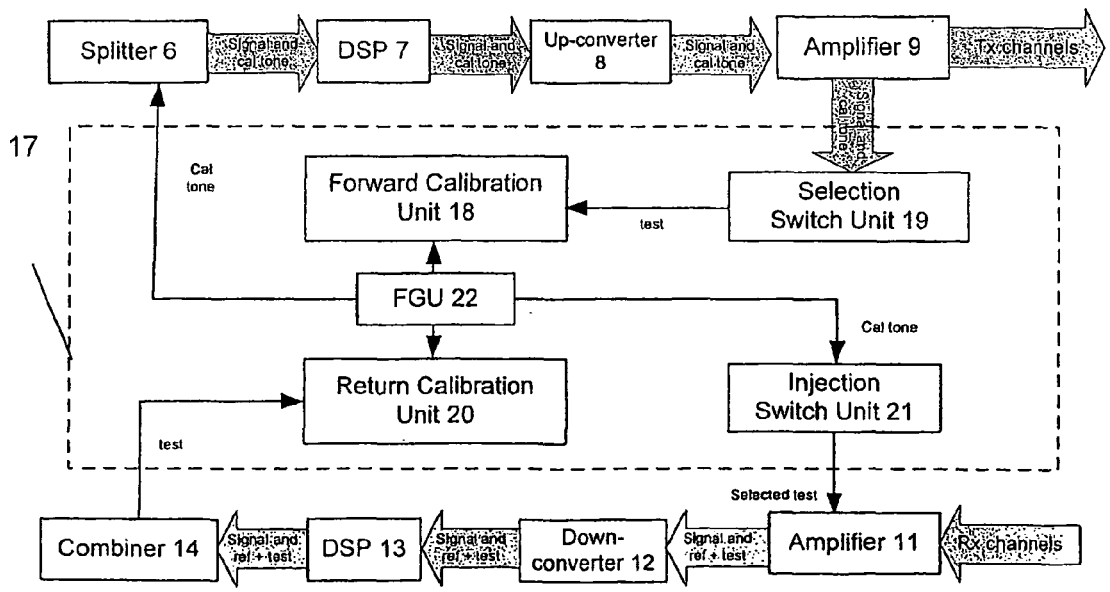
FIG. 11 schematically shows the paths of the signal and the calibration tones through the components of the multi-beam satellite system according to yet another embodiment.

Yet another embodiment is shown in FIG. 11. In this embodiment, the phase and amplitude shift of a test path relative to a fixed reference is found instead of the phase and amplitude shift relative to a test path. The fixed reference may be a pure calibration tone from the frequency generator unit 22, which has not passed through the digital signal processor 7, 13. The forward calibration unit 18 is connected directly to the frequency generator unit 22 and the selection unit 19 is arranged to only forward the signal from one path, the test path, to the forward calibration unit. Similarly, the return calibration unit 20 is connected directly to the frequency generator unit, the injection unit 21 is configured to only inject the calibration tone in one path, the test path and the return calibration unit 20 is configured to only receive the calibration tone from the test path. The other shown components are the same as in FIG. 3 and a detailed description of the components is therefore omitted. The forward and the return calibration units 18, 10 correlate the extracted calibration tone with the pure calibration tone, translated to have the same frequency as the extracted calibration tones, and determine the phase and amplitude shift of the test path. The determined phase and amplitude shift for the test path is sent to the ground station 2 to allow the ground station to calculate the phase and amplitude shift for the test path at other frequencies.

It should be realised that the method of correcting for amplitude and phase offsets introduced by non-linear components in the transmission path, described with respect to FIG. 5, could also be used in the embodiment of FIGS. 10 and 11. Moreover, the method of FIGS. 6 to 9, could also be used in the embodiments of FIGS. 10 and 11. In the embodiment of FIG. 11, the method of FIGS. 6 to 9 would be modified to determine the phase and amplitude offset of all paths in steps S5, S13, S17 and S25 relative to a fixed reference instead of the phase and amplitude offset relative to a reference path.

Whilst specific examples of the invention have been described, the scope of the invention is defined by the appended claims and not limited to the examples. The invention could therefore be implemented in other ways, as would be appreciated by those skilled in the art.

For example, although the invention has been described as implemented in a multi-beam satellite system, the invention could also be used in other signal processing systems.

The invention claimed is:

1. Apparatus for calibrating a multi-beam satellite system comprising a beam forming network providing a plurality of signal paths, the apparatus comprising a calibration processor for determining the phase and amplitude shift of a test path of the plurality of signal paths relative to a reference path of the plurality of signal paths from a first signal extracted from the test path and a second signal extracted from the reference path, the first and second extracted signals corresponding to a calibration tone, said calibration processor configured to either correlate the first signal with the second signal or correlate the first and second signals with a third signal corresponding to said calibration tone in order to compare the phase and amplitude shifts for the test path and the reference path, and the calibration processor further configured to determine the phase and amplitude shift of the test path relative to the reference path for at least two calibration tones of at least two different frequencies to allow a phase and amplitude offset of the test path for a signal of any frequency within an operational frequency range of the multi-beam satellite system to be calculated.

2. Apparatus according to claim 1, wherein the apparatus further comprises a coupler for injecting a calibration tone into the test path and the reference path and the at least two calibration tones comprise two calibration tones of different frequencies at the times of injection.

3. Apparatus according to claim 2, further comprising a digital signal processor for translating the frequency of a calibration tone in the test path and the reference path and wherein the at least two calibration tones comprise at least two calibration tones translated into two different frequencies.

4. Apparatus according to claim 3, wherein the calibration processor is further configured to, for a calibration tone of a specific injection frequency and frequency translation, sequentially select each of the paths from a group of paths of the plurality of paths as the test path to allow the phase and amplitude offset of each path from the group of paths to be determined.

5. Apparatus according to claim 4, wherein the apparatus comprises a beam forming network having a plurality of inputs and a plurality of outputs and the group of paths is selected from all paths through a specific input or all paths through a specific output.

6. Apparatus according to claim 1, wherein the beam forming network is configured to apply corrections to said test path based on the determined relative phase and amplitude shifts of the test path for the at least two calibration tones of the at least two different frequencies.

7. Apparatus according to claim 1 further comprising a transmitter for transmitting the determined phase and amplitude shifts to a ground station and a receiver for receiving corrections to be applied to the beam forming network from the ground station based on the determined phase and amplitude shifts.

8. Apparatus according to claim 1, further comprising
a beam splitter for forwarding a signal to a beam forming network;
an amplifier for amplifying signals from the beam forming network, the test path comprising a path from the beam splitter to the amplifier;
a coupler for injecting a calibration tone into the beam splitter; and
a switch unit for forwarding said signal from said test path from the amplifier to the calibration processor.

9. Apparatus according to claim 1, further comprising
an amplifier for amplifying a signal for a beam forming network;
a signal combiner for combining a signal received from the beam forming network, said test path comprising a path from the amplifier to the combiner;
a switch unit for injecting a calibration tone into the test path in the amplifier; and
a coupler for forwarding said signal from said test path from said signal combiner to the calibration processor.

10. A multi-beam satellite system comprising the apparatus of claim 1.

11. A system comprising the multi-beam satellite system of claim 10 and a ground station configured to receive phase and amplitude shift measurements from the multi-beam satellite system, calculate corrections for a path of the plurality of signal paths and transmit the corrections to the multi-beam satellite system.

12. A system according to claim 11, further comprising a processor for adjusting the determined phase and amplitude shifts and corrections based on the determined phase and amplitude shifts for phase and amplitude shifts introduced by equipment having non-linear phase and amplitude characteristics in the plurality of paths.

13. A method of calibrating a multi-beam satellite system having a beam forming network providing a plurality of signal paths, the method comprising
extracting a first signal from a test path of the plurality of signal paths and a second signal from a reference path of the plurality of signal paths, the first and second signals corresponding to a calibration tone; and
determining from the extracted signals the phase and amplitude shift of the test path relative to the reference path by either correlating the first signal with the second signal or correlating the first and second signals with a third signal corresponding to the calibration tone, wherein the extracting and determining steps are carried out for at least two calibration tones of different frequencies to allow a phase and amplitude offset of the test path for a signal of any frequency within an operational frequency range of the multi-beam satellite system to be calculated from the determined phase and amplitude shifts.

14. A method according to claim 13, wherein extracting signals comprises extracting signals corresponding to a first calibration tone of the at least two calibration tones of different frequencies and subsequently extracting signals corresponding to a second calibration tone of the at least two calibration tones of different frequencies.

15. A method according to claim 14, further comprising injecting calibration tones into the test path and the reference path and wherein the at least two calibration tones of different frequencies comprise two calibration tones of different frequencies at the times of injection into the test path and the reference path.

16. A method according to claim 15, further comprising translating the frequency of a calibration tone in the test path and in the reference path and wherein the at least two calibration tones of different frequencies comprise two calibration tones translated into different frequencies.

17. A method according to claim 6, further comprising, for a calibration tone of a specific injection frequency and frequency translation, sequentially selecting each of the paths from a group of paths of the plurality of paths as the test path to allow the phase and amplitude of each path from the group of paths to be determined.

18. A method according to claim 17, wherein the group of paths is selected from all paths through a specific input to a beam forming network or all paths through a specific output from a beam forming network.

19. A method according to claim 13 further comprising applying a correction to the beam forming network based on the determined relative phase and amplitude shifts of the test path for the at least two calibration tones of different frequencies.

20. A method according to claim 19, further comprising transmitting the determined phase and amplitude shifts to a ground station and receiving said correction from the ground station.

21. A method according to claim 20, further comprising adjusting the determined phase and amplitude shifts and corrections determined based on the determined phase and amplitude shifts for amplitude and phase shifts introduced by non-linear equipment in the plurality of paths.

22. A computer program stored on a non-transitory computer readable storage medium for calibrating a multi-beam satellite system having a beam forming network providing a plurality of signal paths, the computer program comprising instructions that, when executed by a processor, cause the processor to perform the steps of:
    extracting a first signal from a test path of the plurality of signal paths and a second signal from a reference path of the plurality of signal paths, the first and second signals corresponding to a calibration tone; and
    determining from the extracted signals the phase and amplitude shift of the test path relative to the reference path by either correlating the first signal with the second signal or correlating the first and second signals with a third signal corresponding to the calibration tone, wherein the extracting and determining steps are carried out for at least two calibration tones of different frequencies to allow a phase and amplitude offset of the test path for a signal of any frequency within an operational frequency range of the multi-beam satellite system to be calculated from the determined phase and amplitude shifts.

23. Apparatus for calibrating a multi-beam satellite system comprising a beam forming network providing a plurality of signal paths, the apparatus comprising
    a digital signal processor for frequency translating signals;
    a calibration processor for determining the phase and amplitude shift of a test path of a plurality of signal paths relative to a reference path of the plurality of signal paths from a first signal extracted from the test path and a second signal extracted from the reference path, the first and second signals comprising a calibration tone, said tone translated from a first frequency to a second frequency by the digital signal processor, the calibration processor is configured to either correlate the first signal with the second signal or correlate the first and second signals with a third signal corresponding to the calibration tone, said calibration processor configured to determine the phase and amplitude shifts of the test path relative to the reference path for at least two calibration tones of different frequencies and the digital signal processor is configured to apply a correction, based on the determined relative phase and amplitude shifts for the at least two calibration tones, to the test path.

* * * * *